United States Patent
Kawashima et al.

(10) Patent No.: US 11,053,328 B2
(45) Date of Patent: Jul. 6, 2021

(54) PHOTOCURABLE COMPOSITION

(71) Applicant: Panasonic Intellectual Property Management Co., Ltd., Osaka (JP)

(72) Inventors: Keisuke Kawashima, Osaka (JP); Koso Matsuno, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/836,946

(22) Filed: Apr. 1, 2020

(65) Prior Publication Data
US 2020/0325252 A1 Oct. 15, 2020

(30) Foreign Application Priority Data
Apr. 15, 2019 (JP) .............................. JP2019-077036

(51) Int. Cl.
| | |
|---|---|
| C08F 2/46 | (2006.01) |
| C08F 2/50 | (2006.01) |
| C08G 61/04 | (2006.01) |
| C08F 2/48 | (2006.01) |
| C08F 2/52 | (2006.01) |
| C08F 20/18 | (2006.01) |
| C08F 20/32 | (2006.01) |
| C08G 75/26 | (2006.01) |
| C08K 5/07 | (2006.01) |
| C08K 5/31 | (2006.01) |

(52) U.S. Cl.
CPC .................. C08F 2/48 (2013.01); C08F 2/52 (2013.01); C08F 20/18 (2013.01); C08F 20/32 (2013.01); C08G 75/26 (2013.01); C08K 5/07 (2013.01); C08K 5/31 (2013.01)

(58) Field of Classification Search
CPC ... C09D 133/068; C09D 133/08; C08F 20/18; C08F 20/32; C08F 2/52; C08F 2/38; C08F 2/48; C08F 220/325; C08F 220/1805; C08K 5/37; C08K 5/07; C08K 5/31
USPC ................................... 522/99, 1, 148; 520/1
See application file for complete search history.

(56) References Cited

U.S. PATENT DOCUMENTS
| | | | |
|---|---|---|---|
| 2016/0122292 A1 | 5/2016 | Sakai et al. | |
| 2016/0340374 A1 | 11/2016 | Sakai et al. | |
| 2019/0002403 A1 | 1/2019 | Yanaba et al. | |

FOREIGN PATENT DOCUMENTS
| | | | | |
|---|---|---|---|---|
| EP | 2 792 694 | | 10/2014 | |
| EP | 2792694 A1 | * | 10/2014 | ............... C08L 63/00 |
| JP | 2013181991 | * | 9/2013 | |
| WO | 2014/208632 | | 12/2014 | |
| WO | 2015/111640 | | 7/2015 | |
| WO | 2017/018361 | | 2/2017 | |
| WO | 2018/037516 | | 3/2018 | |
| WO | 2018/181421 | | 10/2018 | |
| WO | WO-2018181421 A1 | * | 10/2018 | ................ C08F 2/50 |
| WO | WO-2019142601 A1 | * | 7/2019 | ............ C08G 75/045 |

OTHER PUBLICATIONS

Higashimoto et al, JP 2013181991 Machine Translation, Sep. 12, 2013 (Year: 2013).*
Tamura, WO 2018181421 Machine Translation, Oct. 4, 2018 (Year: 2018).*
Nagasawa et al, WO 2019142601 Machine Translation, Jul. 25, 2019 (Year: 2019).*
Extended European Search Report dated Sep. 8, 2020 in related European Patent Application No. 20166745.8.
Jian et al., "Thiol-epoxy/thiol-acrylate hybrid materials synthesized by photopolymerization", Journal of Materials Chemistry C, No. 1, Jun. 17, 2013, pp. 4481-4489, XP002769443.
Konuray Ali Osman et al, "Latent curing of epoxy-thiol thermosets", Polymer, vol. 116, Mar. 30, 2017, pp. 191-203, XP029987662.

* cited by examiner

*Primary Examiner* — Jessica Whiteley
(74) *Attorney, Agent, or Firm* — Wenderoth, Lind & Ponack, L.L.P.

(57) ABSTRACT

Provided is a photocurable composition including
- a component (A) which is an acrylic ester compound containing one or more acryloyl groups in one molecule;
- a component (B) which is an acrylic ester compound containing one or more acryloyl groups and one or more epoxy groups in one molecule;
- a component (C) which is a compound containing two or more thiol groups in one molecule;
- a component (D) which is a photoradical generator; and
- a component (E) which is a photobase generator,
in which a ratio between a total mass of the component (A) and the component (B) and a mass of the component (C) is in a range of 67.8:32.2 to 88.0:12.0, inclusive.

9 Claims, 1 Drawing Sheet

| Main configuration | Component | Details for configuration | Product name | Example 1 | Example 2 | Example 3 | Example 4 | Example 5 | Comparative example 1 | Comparative example 2 | Comparative example 3 |
|---|---|---|---|---|---|---|---|---|---|---|---|
| Acrylic ester compound | Component (A) | Isoamyl acrylate | Light acrylate IAA | 12.0 | 10.0 | 8.0 | 6.0 | 4.0 | 4.0 | 2.0 | 14.0 |
| Acrylic ester compound containing epoxy group | Component (B) | 4-hydroxybutyl acrylate glycidyl ether | 4HBAGE | 4.6 | 5.8 | 7.0 | 8.2 | 9.3 | 9.4 | 10.5 | 3.4 |
| Compound containing thiol group | Component (C) | Pentaerythritol tetrakis (3-mercaptobutyrate) | PE-1 | 3.1 | 3.9 | 4.7 | 5.5 | 6.4 | 6.4 | 7.2 | 2.3 |
| Photoradical generator | Component (D) | 1-hydroxycyclohexyl phenyl ketone | Omnirad184 | 0.1 | 0.1 | 0.1 | 0.1 | 0.1 | 0.1 | 0.1 | 0.1 |
| Photobase generator | Component (E) | 1,2-disopropyl-3[bis(dimethylamino) methylene] guanidium 2-(3-benzoylphenyl) propionate | WPBG-266 | 0.2 | 0.2 | 0.2 | 0.2 | 0.2 | 0.06 | 0.2 | 0.2 |
| Total amount (mass/g) | | | | 20.0 | 20.0 | 20.0 | 20.0 | 20.0 | 20.0 | 20.0 | 20.0 |
| Ratio between total amount of component (A) and component (B) and amount of component (C) (percentage) | | | | 84.2 | 80.1 | 76.0 | 71.8 | 68.0 | 67.7 | 63.6 | 88.3 |
| Parts by mass of component (A) in case of setting total amount of all components to 100 parts by mass | | | | 15.8 | 19.9 | 24.0 | 28.2 | 32.0 | 32.3 | 36.4 | 11.7 |
| Parts by mass of component (B) in case of setting total amount of all components to 100 parts by mass | | | | 59.9 | 50.0 | 40.0 | 30.0 | 20.0 | 20.0 | 10.0 | 70.0 |
| Parts by mass of component (C) in case of setting total amount of all components to 100 parts by mass | | | | 23.0 | 28.9 | 34.8 | 40.8 | 46.7 | 47.1 | 52.7 | 17.0 |
| Parts by mass of component (D) in case of setting total amount of all components to 100 parts by mass | | | | 15.6 | 19.6 | 23.7 | 27.7 | 31.8 | 32.1 | 35.8 | 11.5 |
| Parts by mass of component (E) in case of setting total amount of all components to 100 parts by mass | | | | 0.5 | 0.5 | 0.5 | 0.5 | 0.5 | 0.5 | 0.5 | 0.5 |
| | | | | 1.0 | 1.0 | 1.0 | 1.0 | 1.0 | 0.3 | 1.0 | 1.0 |
| Curability | State after irradiation with UV | | | Liquid state | Liquid state | Liquid state | Liquid state | Liquid state | Liquid state | Cured | Liquid state |
| | Delay time (min) | | | 58 | 45 | 27 | 9 | 5 | Uncured | — | Uncured |
| Storage stability | Viscosity change rate after 3 days from refrigeration (10°C) | | | 3% | 6% | 5% | 9% | 10% | <1% | 15% | <1% |
| | Determination | | | A | A | A | A | A | A | B | B |
| Overall determination | Determination | | | A | A | A | A | A | B | B | B |

# PHOTOCURABLE COMPOSITION

BACKGROUND

1. Technical Field

The present disclosure relates to a photocurable composition.

2. Description of the Related Art

An optically transparent adhesive is used for attachment of a constituent member such as a liquid crystal display device for the purpose of improving the visibility of the liquid crystal display device. As such a transparent adhesive, an adhesive that is cured from a liquid state to a solid state due to irradiation with light, heating, or addition of moisture can be used. Particularly, a photocurable composition that is cured due to irradiation with light and uses radical species generated due to irradiation with light as a reaction initiator has been widely used.

In the composition using radical species as a reaction initiator, the polymerization reaction may be inhibited by the radical species being captured by oxygen. In such a case, curing failure of the composition may occur. Accordingly, in the composition using radical species as a reaction initiator, an action for blocking oxygen during the curing reaction is required.

As a photocurable composition in which the polymerization reaction is unlikely to be inhibited by oxygen, development of a composition using cationic species as a reaction initiator has been promoted. However, since a strong acid that is generated by irradiation with light functions as a reaction initiator, corrosion or yellowing of a cured product or peripheral members thereof due to the strong acid may become a problem in the composition using cationic species as a reaction initiator. In the polymerization reaction using cationic species as a reaction initiator, the inhibition reaction is not inhibited by oxygen, but the polymerization reaction can be inhibited due to the presence of moisture. Therefore, in the composition using cationic species as a reaction initiator, an action for blocking moisture is required.

In the above-described background, a composition using anionic species as a reaction initiator has attracted attention. In the composition using anionic species as a reaction initiator, contraction at the time of curing the composition is small. In the composition using anionic species as a reaction initiator, the polymerization reaction is not inhibited by oxygen or moisture, and thus corrosion or yellowing of a cured product or peripheral members due to the reaction initiator is unlikely to occur.

For example, WO2018/037516A describes a polymerization reaction using radical species and anionic species as a reaction initiator. WO2018/037516A describes that both the elastic modulus suitable for attachment and a sufficient level of the curing rate after the attachment can be achieved.

SUMMARY

According to the present disclosure, there is provided a photocurable composition including:
a component (A) which is an acrylic ester compound containing one or more acryloyl groups in one molecule;
a component (B) which is an acrylic ester compound containing one or more acryloyl groups and one or more epoxy groups in one molecule;
a component (C) which is a compound containing two or more thiol groups in one molecule;
a component (D) which is a photoradical generator; and
a component (E) which is a photobase generator,
in which a ratio between a total mass of the component (A) and the component (B) and a mass of the component (C) is in a range of 67.8:32.2 to 88.0:12.0, inclusive.

BRIEF DESCRIPTION OF THE DRAWING

FIG. 1 is a table showing the details of the examination and the evaluation results of Examples 1 to 5 and Comparative Examples 1 to 3.

DETAILED DESCRIPTION

In the photocurable composition described in WO2018/037516A, a first-stage polymerization reaction using radical species as a reaction initiator and a second-stage reaction using anionic species as a reaction initiator occur. However, in the composition described in WO2018/03751.6A, the speed of the second-stage reaction is significantly slower than the speed of the first-stage polymerization reaction. Specifically, in order to measure the adhesive strength after delated curing in a glass joined body that contains a curable resin layer in the examples of WO2018/037516A, it is necessary to allow the joined body to stand for 48 hours. Such a curable composition may not be practically used as an adhesive.

An object of the present disclosure is to provide a photocurable composition that is capable of controlling the time taken from irradiation with active energy rays to the start of the second-stage reaction to be in an appropriate range.

Hereinafter, the present disclosure will be described in detail. The present disclosure is not limited to the following exemplary embodiment.

Hereinafter, a photocurable composition will be described in detail. Photocurable composition A photocurable composition according to an exemplary embodiment of the present disclosure includes
a component (A) which is an acrylic ester compound containing one or more acryloyl groups in one molecule;
a component (B) which is an acrylic ester compound containing one or more acryloyl groups and one or more epoxy groups in one molecule;
a component (C) which is a compound containing two or more thiol groups in one molecule;
a component (D) which is a photoradical generator; and
a component (E) which is a photobase generator, and
the ratio between the total mass of the component (A) and the component (B) and the mass of the component (C) is in a range of 67.8:32.2 to 88.0:12.0.

In the photocurable composition according to the exemplary embodiment of the present disclosure, in a case where active energy rays are applied, the component (D) is decomposed to generate a radical, and the component (E) is decomposed to generate a base. As the first-stage reaction, the above-described radical is polymerized as a reaction initiator by the acryloyl group contained in the component (A) and the component (B). Due to this polymerization reaction, a polymer containing an epoxy group in a molecule is generated. As the second-stage reaction, the component (C) reacts with a polymer containing an epoxy group generated from the first-stage reaction, using the above-described base as a reaction initiator. In the photocurable composition according to the exemplary embodiment of the present disclosure, since the speed of the second-stage reaction is slower than the speed of the first-stage reaction, the time taken from the irradiation with active energy rays (specifically, completion of the irradiation) to the start of the second-stage reaction can be controlled. Further, the start of the second-stage reaction can be confirmed based on the viscosity of the photocurable composition. Specifically, in a case where the viscosity of the photocurable composition increases, it can be determined that the second-stage reaction has started.

Examples of the active energy rays include ultraviolet rays (UV), electron beams, α-rays, and β-rays. Specifically, ultraviolet rays may be exemplified.

The irradiation with active energy rays is not particularly limited, but can be performed, for example, in a temperature range of 20° C. to 30° C.

The first-stage reaction is not particularly limited, but can be performed at room temperature, for example. The first-stage reaction can be performed specifically in a temperature range of 15° C. to 40° C. and more specifically in a temperature range of 20° C. to 30° C. In a case where the temperature of the first-stage reaction is extremely high, the second-stage reaction can be promoted during the first-stage reaction more than necessary, and accordingly it may become difficult to control the time taken to the start of the second-stage reaction.

The second-stage reaction is not particularly limited, but can be performed in a temperature range of 40° C. to 80° C. Specifically, the second-stage reaction can be performed in a temperature range of 50° C. to 70° C.

The time taken from the irradiation with active energy rays to the start of the second-stage reaction can be, for example, 20 hours or shorter, 12 hours or shorter, 1 hour or shorter, 50 minutes or shorter, or 30 minutes or shorter and may be 3 minutes or longer or 5 minutes or longer. The time can be, for example, in a range of 3 minutes to 1 hour, in a range of 1 minute to 1 hour, in a range of 5 minutes to 50 minutes, or 10 minutes to 30 minutes.

A sufficient working time can be ensured during a time period after the irradiation of the photocurable composition with active energy rays before the start of the second-stage reaction by adjusting the time taken from the irradiation with the active energy rays to the start of the second-stage reaction (for example, the curing reaction) to be in the above-described range. Such a photocurable composition can be usefully used as a delayed curing type adhesive.

Hereinafter, each component will be described in detail.
Component (A): Acrylic Ester Compound The compound of the component (A) is a compound which can be polymerized by the radical reaction.

The compound of the component (A) contains one or more acryloyl groups in one molecule. The compound of the component (A) may contain one to four acryloyl groups, preferably one or two acryloyl groups, and more preferably one acryloyl group.

It is preferable that the compound of the component (A) does not contain an epoxy group in the molecular structure. In other words, it is preferable that the compound of the component (A) is an acrylic ester compound that contains one or more acryloyl groups in one molecule and does not contain an epoxy group in the molecular structure.

It is preferable that the compound of the component (A) has an oxygen atom bonded to the acryloyl group ($CH_2$=CHCO—). Specifically, the component (A) may be a compound that contains an acryloyloxy group ($CH_2$=CHCOO—).

According to one aspect, the compound of the component (A) does not contain an epoxy group in a portion bonded to ether oxygen of the acryloxy group. That is, in a case where the compound of the component (A) is represented by $CH_2$=CHCOO—R, the group represented by R does not contain an epoxy group.

It is preferable that the compound of the component (A) has a structure in which at least one selected from the group consisting of an aliphatic structure and an aromatic structure is bonded to ether oxygen of the acryloyloxy group. Among the structure, the structure in which an aliphatic structure is bonded thereto is more preferable.

The "aliphatic structure" is not particularly limited, and examples thereof include an aliphatic hydrocarbon group and an aliphatic ether group. It is preferable that the "aliphatic structure" is a structure that does not contain an epoxy group therein.

As the "aliphatic hydrocarbon group", a hydrocarbon group having 1 to 20 carbon atoms can be exemplified. Specifically, a hydrocarbon group having 5 to 20 carbon atoms can also be exemplified. In the present specification, the "hydrocarbon group" is a hydrocarbon formed of a carbon atom and a hydrogen atom and indicates a group formed by removing one or two or more hydrogen atoms.

The "aliphatic ether group is a structure that has an oxygen atom in the terminal part or in the structure of an aliphatic hydrocarbon group. As the aliphatic ether group, a structure that contains an ethylene oxide group in the terminal part or in the structure of an aliphatic hydrocarbon group can be exemplified. The number of the ethylene oxide groups contained in the aliphatic ether group is, for example, in a range of 1 to 14 and specifically in a range of 1 to 9.

The "aromatic structure" is not particularly limited, and examples thereof include benzyl acrylate, phenoxy ethyl acrylate, and phenoxy diethylene glycol acrylate. It is preferable that the "aromatic structure" is a structure that does not contain an epoxy group therein.

The compound of the component (A) is not particularly limited, and examples thereof include a compound containing an aliphatic hydrocarbon group such as isoamyl acrylate, octyl acrylate, stearyl acrylate, or lauryl acrylate; and a compound containing an aliphatic ether group such as 2-methoxy ethyl acrylate, ethoxy-diethylene glycol acrylate, or methoxy-polyethylene glycol acrylate.

The component (A) may be used alone or in combination of two or more kinds thereof.

The content of the component (A) in the photocurable composition according to the exemplary embodiment of the present disclosure is preferably 20 parts by mass or greater and less than GO parts by mass, more preferably in a range of 25 parts by mass to 55 parts by mass, still more preferably 25 parts by mass or greater and less than 50 parts by mass, and particularly preferably in a range of 25 parts by mass to 45 parts by mass with respect to 100 parts by mass which is the total mass of the component (A), the component (B), the component (C), the component (D), and the component (E). According to an aspect, the content of the component (A) therein may be, for example, 30 parts by mass or greater and less than 50 parts by mass or in a range of 30 parts by mass to 40 parts by mass with respect to 100 parts by mass which is the total mass of the component (A), the component (B), the component (C), the component (D), and the component (E).

In a case where the content of the component (A) is in the above-described range, the first-stage reaction in the photocurable composition can proceed satisfactorily, and a composition obtained after the photocurable composition is irradiated with active energy rays can have fluidity. Further, the "fluidity" indicates a state in which the shape of an object cannot be maintained in a case of being touched by a finger, and the object becomes sticky and exhibits tackiness. In a case where the viscoelasticity of the object is measured and the loss elastic modulus is larger than the storage elastic modulus, the object can have "fluidity".

In a case where the content of the component (A) is extremely large, the photocurable composition is not cured in some cases.

In the photocurable composition according to the exemplary embodiment of the present disclosure, since the total amount of the mass of the component (A) and the mass of the component (B), and the mass of the component (C) are in a specific range, the content of the component (B) increases as the content of the component (A) extremely decreases. In such a case, it may become difficult to control the time taken from the irradiation with active energy rays to the start of the second-stage reaction. Specifically, the time taken for curing the composition immediately after irradiation of the photocurable composition with active energy rays or the time taken from the irradiation with active energy rays to the start of the second-stage reaction can be shortened.

Component (B): Acrylic Ester Compound Containing One or More Acryloyl Groups and One or More Epoxy Groups in One Molecule The compound of the component (B) is a compound that can be polymerized by the photoradical reaction and reacts due to anionic polymerization. The compound of the component (13) is not particularly limited as long as the compound is an acrylic ester compound that contains one or more acryloyl groups and one or more epoxy groups in one molecule.

The component (B) is a compound that contains one to four acryloyl groups, preferably one or two acryloyl groups, and more preferably one acryloyl group.

The component (B) is a compound that contains, for example, one to four epoxy groups, preferably one or two epoxy groups, and more preferably one epoxy group.

The compound of the component (B) contains preferably one to four acryloyl groups and one or two epoxy groups, more preferably one or two acryloyl groups and one or two epoxy groups, and still more preferably one acryloyl group and one epoxy group.

It is preferable that an oxygen atom bonded to an acryloyl group ($CH_2$=CHCO—) is present in the compound of the component (B). Specifically, the component (B) can be a compound that contains an acryloyloxy group ($CH_2$=CHCOO—).

In the component (B), the epoxy group is contained in a portion bonded to ether oxygen of the acryloyloxy group. That is, in a case where the component (B) is represented by $CH_2$=CHCOO—R', the group represented by IV contains an epoxy group. It is preferable that an aliphatic hydrocarbon structure is present between the ether oxygen and the epoxy group in the compound of the component (B).

The "aliphatic hydrocarbon structure" may have a heteroatom therein. Examples of the heteroatom include an oxygen atom.

Examples of the "aliphatic hydrocarbon structure" include a structure of an aliphatic hydrocarbon group and a structure that has an oxygen atom in the terminal part or in the structure of an aliphatic hydrocarbon group.

As the "aliphatic hydrocarbon group", a group having 1 to 5 carbon atoms can be exemplified.

In the "structure that has an oxygen atom in the terminal part or in the structure of an aliphatic hydrocarbon group", it is preferable that the oxygen atom forms an ether bond.

Examples of the structure include a structure represented by —$(CH_2)_{n1}$—O—$(CH_2)_{n2}$—. It is preferable that the left side of —$(CH_2)_{n1}$—O—$(CH_2)_{n2}$— is bonded to the oxygen atom bonded to an acryloyl group and the right side thereof is bonded to an epoxy group. Here, n1 and n2 each independently represent, for example, an integer of 0 to 10. The total value of n1 and n2 is 1 or greater.

The compound of the component (B) is not particularly limited, and examples thereof include glycidyl acrylate and 4-hydroxybutyl acrylate glycidyl ether.

The component (B) may be used alone or in combination of two or more kinds thereof.

The content of the component (B) in the photocurable composition according to the exemplary embodiment of the present disclosure is preferably 20 parts by mass or greater and less than 48 parts by mass, more preferably 23 parts by mass or greater and less than 48 parts by mass, still more preferably 23 parts by mass or greater and less than 47 parts by mass, particularly preferably 28 parts by mass or greater and less than 42 parts by mass, still more preferably in a range of 34 parts by mass to 42 parts by mass, and even still more preferably in a range of 35 parts by mass to 41 parts by mass with respect to 100 parts by mass which is the total mass of the component (A), the component (B), the component (C), the component (D), and the component (E).

In a case where the content of the component (B) is in the above-described range, both the first-stage reaction resulting from the radical reaction and the second-stage reaction resulting from photoanionic polymerization in the photocurable composition can proceed satisfactorily. In the case where the content of the component (B) is in the above-described range, the time taken from the irradiation with active energy rays to the start of the second-stage reaction can be set to be in an appropriate range. Further, in a case where the content of the component (B) is set to be large in the above-described range, the delay time can be set to be short. Meanwhile, in a case where the content of the component (B) is set to be small in the above-described range, the delay time can be set to be long.

In a case where the content of the component (B) is extremely small, the second-stage reaction (for example, the curing reaction) in the photocurable composition does not occur or the reaction is unlikely to occur.

In a case where the content of the component (B) is extremely large, an unreacted epoxy group may remain in the cured product obtained by curing the photocurable composition. In such a case, the cured product may deteriorate with time.

In the present specification, the time taken from the irradiation with active energy rays to the start of the second-stage reaction is "set to be in an appropriate range" indicates that the time taken from the completion of the irradiation with active energy rays to the start of the second-stage reaction is 60 minutes or shorter, specifically 50 minutes or shorter, and more specifically 30 minutes or shorter. The lower limit of the time taken to the second-stage reaction is, for example, 3 minutes, specifically 5 minutes, and more specifically 7 minutes.

Here, the time taken from the irradiation with active energy rays to the start of the second-stage reaction is also referred to as "delay time". The "delay time" can be measured by heating the composition at a temperature of 60° C. and a speed of 5° C./min immediately after completion of the irradiation with active energy rays (for example, UV) at 25° C. and maintaining the temperature at 60° C. The delay time is measured using, for example, a UV irradiation type rheometer. During the measurement, the humidity can be set to be in a range of, for example, 25% RH to 80% RH.

Component (C): Compound Containing Two or More Thiol Groups in One Molecule

The compound of the component (C) is a compound that reacts using anionic polymerization and can contribute to curing of the photocurable composition. The compound of the component (C) is not particularly limited as long as the compound contains a thiol group in one molecule.

The compound of the component (C) contains, for example, two or more thiol groups, preferably three to six thiol groups, and more preferably three or four thiol groups in one molecule.

As the compound of the component (C), a compound that does not contain a carboxylic acid group in the molecular structure is preferable, and a compound (such as thioglycolic acid) that does not contain both a thiol group and a carboxylic acid group in the molecular structure is more preferable.

In the compound of the component (C), it is preferable that the thiol group is a secondary thiol group. The secondary thiol group indicates a structure in which a thiol group is bonded to a secondary carbon and is specifically represented by $CH_3CH(SH)$—.

The compound of the component (C) is not particularly limited, and examples thereof include pentaerythritol tetrakis(3-mercaptobutyrate), 1,4-bis(3-mercaptobutyryloxy)butane, and 1,3,5-tris(2-(3-sulfanylbutanoyloxy)ethyl)-1,3,5-triazinan-2,4,6-trione. Among these, from the viewpoint that the reactivity is particularly excellent, pentaerythritol tetrakis(3-mercaptobutyrate) or 1,4-bis(3-mercaptobutyryloxy)butane is preferably used.

The content of the component (C) in the photocurable composition according to the exemplary embodiment of the present disclosure is preferably 15 parts by mass or greater and less than 35 parts by mass, more preferably 15 parts by mass or greater and less than 32 parts by mass, and particularly preferably 19 parts by mass or greater and less than 28 parts by mass with respect to 100 parts by mass which is the total mass of the component (A), the component (B), the component (C), the component (D), and the component (E).

In a case where the content of the component (C) is in the above-described range, the photocurable composition can be cured more satisfactorily.

In a case where the content of the component (C) is extremely small, the photocurable composition is not cured or is not sufficiently cured in some cases.

In a case where the content of the component (C) is extremely large, an unreacted thiol group may remain in the cured product obtained by curing the photocurable composition. In such a case, the cured product may deteriorate with time.

Component (D): Photoradical Generator

The component (D) is a compound that is decomposed by being irradiated with active energy rays to generate a radical and initiates radical polymerization of a radically polymerizable compound.

The component (D) is not particularly limited as long as the compound is decomposed by being irradiated with active energy rays, for example, ultraviolet rays and generates a radical.

It is preferable that the compound of the component (D) is at least one selected from the group consisting of an acetophenone-based compound, a benzoin-based compound, a benzophenone-based compound, a thioxane-based compound, an alkylphenone-based compound, and an acylphosphine oxide-based compound.

It is preferable that the component (D) does not contain an amino group in the molecular structure. In a case where the compound of such a component (D) is used, the reaction of the thiol group contained in the compound of the component (C) with the component (D) can be suppressed. In a case where a compound that does not contain an amino group is used as the component (D), thickening is unlikely to occur during the storage of the photocurable composition. The photocurable composition that contains such a component (D) is advantageous in terms of the storage stability of the photocurable composition.

According to an aspect, the component (D) is an alkylphenone-based compound. Since the solubility of the component (D) in the component (A) and the component (B) is excellent and a radical can be easily generated by irradiation with light, the component (D) can be effectively used as a polymerization initiator.

Examples of the acetophenone-based compound include 2-hydroxy-2-methylpropiophenone and 2-hydroxy-4'-(2-hydroxyethoxy)-2-methylpropiophenone.

Examples of the benzoin-based compound include 2-hydroxy-2-phenylacetophenone and 4,4'-dimethoxybenzoin.

Examples of the benzophenone-based compound include benzophenone and benzophenone-4-carboxylic acid.

Examples of the thioxane-based compound include 2-chlorothioxanthone and 2-isopropylthioxanthone.

Examples of the acylphosphine oxide-based compound include diphenyl(2,4,6-trimethylbenzoyl) phosphine oxide and phenylbis(2,4,6-trimethylbenzoyl) phosphine oxide.

The component (D) is not particularly limited, and examples thereof include an alkylphenone-based compound such as 1-hydroxycyclohexyl phenyl ketone, 2-hydroxy-2-methyl-1-phenylpropanone, 1-[4-(2-hydroxyethoxy)-phenyl]-2-hydroxymethylpropanone, or 2-hydroxy-1-(4-(4-(2-hydroxy-2-methylpropionyl)benzyl)phenyl)-2-methylpropan-1-one.

The component (D) may be used alone or in combination of two or more kinds thereof.

The content of the component (D) in the photocurable composition according to the exemplary embodiment of the present disclosure may be, for example, 0.3 parts by mass or greater and less than 2 parts by mass, 0.3 parts by mass or greater and less than 1.5 parts by mass, or 0.3 parts by mass or greater and less than 1.2 parts by mass with respect to 100 parts by mass which is the total mass of the component (A), the component (B), the component (C), the component (D), and the component (E).

In a case where the content of the component (D) is in the above-described range, the radical polymerization of the component (A) and the component (B) can proceed satisfactorily.

In a case where the content of the component (D) is extremely small, oxygen in air or a polymerization inhibitor that can be contained in the photocurable composition may react with the radical generated from the component (D) to inhibit the radical polymerization which is the first-stage reaction.

In a case where the photocurable composition has heat, radicals may be generated from the component (D) even in a case where the photocurable composition is light-shielded and stored. In such a case, in a case where the content of the component (D) is extremely large, the amount of radicals to be generated may increase. From the viewpoint of the storage stability, it is not preferable that the amount of radicals is extremely large.

Component (E): Photobase Generator

The component (E) is a compound that is decomposed by being irradiated with active energy rays to generate an anion (base). Due to the anion generated from the component (E), hydrogen is drawn out from the compound of the component (C), specifically, the thiol group contained in the component (C) and reacts with the epoxy group contained in the compound of the component (B).

The component (E) contributes to the second-stage reaction. As the second-stage reaction, the curing reaction for curing the photocurable composition is exemplified. The curing reaction may include a reaction for crosslinking polymers.

The component (E) is a compound that is decomposed by being irradiated with active energy rays such as ultraviolet rays to generate an anion.

The component (E) is a latent compound with respect to active energy rays (such as light, specifically, ultraviolet rays), that is, a compound that generates an anion by being irradiated with active energy rays (such as light, specifically, ultraviolet rays). Further, the compound (E) is a compound in which an anion is not generated in the absence of active energy rays. In a case of using such a compound, the polymerization reaction does not proceed during the storage, and the viscosity of the photocurable composition is unlikely to increase.

It is preferable that the component (E) contains at least one selected from the group consisting of a carboxylate having a xanthone skeleton, a carboxylate having a ketoprofen skeleton, a salt having a borate anion, and a carbamate compound.

Examples of the carboxylate having a xanthone skeleton include 1,5,7-triazabicyclo[4.4.0]dec-5-ene 2-(9-oxoxanthen-2-yl) propionate and 1,8-diazabicyclo[5.4.0]undec-7-ene 2-(9-oxoxanthen-2-yl) propionate.

Examples of the carboxylate having a ketoprofen skeleton include 1,2-disopropyl-3-[bis(dimethylamino)methylene] guanidium 2-(3-benzoylphenyl) propionate and 1,8-diazabicyclo[5.4.0]undec-7-ene 2-(3-benzoylphenyl)propionate.

Examples of the salt having a borate anion include 1,2-dicyclohexyl-4,4,5,5-tetramethyldiguadium n-butyl triphenylborate.

Examples of the carbamate compound include (2-nitrophenyl)methyl 4-(methacryloyloxy) piperidine-1-carboxylate and 2-nitrobenzyl cyclohexyl carbamate.

According to an aspect, the component (E) contains one or more of a carboxylate having a xanthone skeleton, a carboxylate having a ketoprofen skeleton, and a salt having a borate anion.

In the aspect, it is preferable to use, as the component (E), a compound that is capable of generating a strong base such as amidine, guanidine, or a phosphazene base. In a case of using such a compound, hydrogen is drawn out from the compound of the component (C) by the base generated due to decomposition of the component (E) and reacts with an epoxy group derived from the compound of the component (B). Since the base to be generated is a strong base, the above-described reaction can proceed particularly rapidly, and the efficiency of the second-stage reaction of the photocurable composition can be increased. As the result, the photocurable composition can be cured particularly satisfactorily.

Examples of the component (E) include 1,5,7-triazabicyclo[4,4,0]dec-5-ene 2-(9-oxoxanthen-2-yl) propionate, 1,8-diazabicyclo[5.4.0]undec-7-ene 2-(9-oxoxanthen-2-yl) propionate, 1,2-dicyclohexyl-4,4,5,5-tetramethyldiguadium n-butyl triphenyl borate, and 1,2-disopropyl-3-[bis(dimethylamino)methylene] guanidium 2-(3-benzoylphenyl) propionate. Since the base to be generated in these compounds is a strong base, the second-stage reaction (for example, the curing reaction) can proceed satisfactorily.

The content of the component (E) in the photocurable composition according to the exemplary embodiment of the present disclosure is preferably 0.5 parts by mass or greater and less than 5.0 parts by mass, more preferably 0.7 parts by mass or greater and less than 2 parts by mass, and still more preferably in a range of 0.8 parts by mass to 1.2 parts by mass with respect to 100 parts by mass which is the total mass of the component (A), the component (B), the component (C), the component (D), and the component (E).

In a case where the content of the component (E) is in the above-described range, the second-stage reaction of the photocurable composition can proceed satisfactorily. In the case where the content of the component (E) is in the above-described range, the time taken from the irradiation of the photocurable composition with active energy rays to the start of the second-stage reaction can be set to be in an appropriate range.

In a case where the content of the component (E) is extremely small, the amount of the base to be generated due to irradiation with light may decrease such that the amount thereof becomes insufficient for curing of the photocurable composition.

In a case where the content of the component (E) is extremely large, a large amount of isolated anions can be present in the photocurable composition. In such a case, the storage stability of the photocurable composition may be impaired.

In the photocurable composition according to the exemplary embodiment of the present disclosure, the ratio between the total mass of the component (A) and the component (B) and the mass of the component (C) is in a range of 67.8:32.2 to 88.0:12.0, inclusive, may be, for example, in a range of 67.8:32.2 to 87.0:13.0, inclusive, in a range of 67.8:32.2 to 86.0:14.0, inclusive, in a range of 67.8:32.2 to 85.0:15.0, inclusive, or in a range of 68.0:32.0 to 84.2:15.8, inclusive.

In a case where the above-described ratio between the component (A), the component (B), and the component (C) is in the above-described range, the reaction speed of the first-stage reaction and the second-stage reaction is easily controlled so that the time taken from the irradiation with active energy rays to the start of the second-stage reaction can be adjusted.

In the photocurable composition according to the exemplary embodiment of the present disclosure, the ratio between the mass of the component (A) and the mass of the component (B) is preferably in a range of 20:80 to 80:20, inclusive, more preferably in a range of 30:70 to 80:20, inclusive, still more preferably in a range of 40:60 to 75:25, inclusive, and even still more preferably in a range of 40:60 to 60:40, inclusive.

In a case where the ratio between the mass of the component (A) and the mass of the component (B) is in the above-described range, the time taken from the irradiation with active energy rays to the start of the second-stage reaction can be set to be in an appropriate range. Specifically, the photocurable composition can be set to be cured after elapse of a specific time from the irradiation with active energy rays without being cured immediately after the irradiation with active energy rays.

In a case where the content of the component (A) is extremely large, the second-stage reaction may become difficult to proceed. As the result, the photocurable composition is not cured in some cases.

In a case where the content of the component (A) is extremely small, the content of the component (B) increases. In such a case, it may become difficult to control the time taken from the irradiation with active energy rays to the start of the second-stage reaction. Specifically, the time taken for curing the composition immediately after irradiation of the photocurable composition with active energy rays or the time taken from the irradiation with active energy rays to the start of the second-stage reaction can be shortened.

In the photocurable composition according to the exemplary embodiment of the present disclosure, the ratio between the mol number of the acryloyl group in the compound of the component (A) and the mol number of the acryloyl group in the compound of the component (B) is preferably in a range of 38:62 to 79:21, inclusive, more preferably in a range of 40:60 to 70:30, inclusive, and still more preferably in a range of 45:55 to 65:35, inclusive.

In a case where the above-described ratio is in the above-described range, the content of the epoxy group contained in a polymer to be formed by the first-stage reaction can be adjusted to be in an appropriate range. As the result, the second-stage reaction can proceed satisfactorily. In the case where the above-described ratio is in the above-described range, the time taken from the irradiation with active energy rays to the start of the second-stage reaction can be set to be in an appropriate range. Specifically, the photocurable composition can be set to be cured after a specific time from the irradiation with active energy rays without being cured immediately after the irradiation with active energy rays.

In the photocurable composition according to the exemplary embodiment of the present disclosure, the ratio between the mass of the component (B) and the mass of the component (C) is preferably in a range of 50:50 to 70:30, inclusive.

In a case where the mass of the component (B) and the mass of the component (C) is in the above-described range, the second-stage reaction can proceed satisfactorily. In a case where the above-described ratio is in the above-described range, the photocurable composition can exhibit satisfactory curability, and the time taken from the irradiation with light to the start of the curing can be set to be in an appropriate range.

It is preferable that the photocurable composition according to the exemplary embodiment of the present disclosure contains the epoxy group contained in the component (B) and the thiol group contained in the component (C) at a specific ratio. For example, the ratio between the mol number of the epoxy group contained in the component (B) and the mol number of the thiol group contained in the component (C) may be in a range of 70:30 to 90:10, inclusive.

In such a case, the photocurable composition contains the epoxy group of the component (B) and the thiol group of the component (C) at the concentration such that the epoxy group can sufficiently react with the thiol group. In a case where the content of the epoxy group contained in the component (B) and the content of the thiol group contained in the component (C) are respectively in the above-described range, the photocurable composition can exhibit satisfactory curability, and the time taken from the irradiation with light to the start of the curing can be set to be in an appropriate range.

In a case where the content of the component (B) or the component (C) is large, an unreacted epoxy group or thiol group may remain in the cured product obtained by curing the photocurable composition. In such a case, the cured product may deteriorate with time.

The ratio between the total mass of the component (B) and the component (C) and the mass of the component (E) in the photocurable composition according to the present exemplary embodiment may be in a range of 99:1 to 97:3, inclusive.

Other components such as various resins and additives may be blended with the photocurable composition according to the present exemplary embodiment within a range where delay curability and the storage stability are not impaired.

Examples of various resins include elastomer components such as liquid rubber.

Examples of the additives include an antioxidant.

As described above, the first-stage reaction in which the acryloyl group contained in the compound of the component (A) reacts with the acryloyl group contained in the compound of the component (B) and the second-stage reaction in which the epoxy group contained in the compound of the component (B) reacts with the thiol group contained in the compound of the component (C) occur in the photocurable composition according to the exemplary embodiment of the present disclosure.

In the first-stage reaction, the polymerization reaction occurs between the compound of the component (A) and the compound of the component (B) to obtain a composition that contains an epoxy resin containing an epoxy group (specifically, an epoxy resin containing an epoxy group derived from the component (B)). In this polymerization reaction, since the crosslinking reaction does not substantially occur, the composition obtained after the polymerization reaction maintains the fluidity.

In the second-stage reaction, the epoxy group contained in the compound of the component (B) reacts with the thiol group contained in the compound of the component (C). Accordingly, the time for curing the photocurable composition according to the exemplary embodiment of the present disclosure can be changed by the time for the second-stage reaction.

That is, the photocurable composition according to the exemplary embodiment of the present disclosure has delay curability. The "delay curability" in the present specification indicates a state in which it takes time from the irradiation with light to the curing instead of immediate curing after irradiation with light as in a case of a photocurable resin of the related art. In a case where the photocurable composition has the "delay curability", for example, the second-stage reaction may occur later than the first-stage reaction. A sufficient working time can be ensured during a time period after the irradiation of the photocurable composition with active energy rays before the start of the second-stage reaction in a case where the photocurable composition has the delay curability.

The storage stability of the photocurable composition according to the exemplary embodiment of the present disclosure is satisfactory. This is because reaction active species such as radical species or anion species are not generated in the photocurable composition according to the exemplary embodiment of the present disclosure in a case where the photocurable composition is not irradiated with active energy rays.

The stability indicates that in a case where the photocurable composition is allowed to stand (stored) at 10° C. for 3 days in a state of not being irradiated with active energy rays, the viscosity after storage is in a range of 90 to 110 with respect to 100 which is the viscosity before the storage.

The photocurable composition according to the exemplary embodiment of the present disclosure can be prepared by respectively weighing the component (A), the component (B), the component (C), the component (D), and the component (E), adding other components as necessary, and sufficiently mixing the mixture. The mixing method is not particularly limited. For example, the mixture may be mixed using a mixing device known to those skilled in the art.

By using the photocurable composition of the present disclosure, attachment of members after irradiation with active energy rays becomes easy. For example, members having a shape that makes it difficult to perform irradiation with active energy rays after attachment of members can adhere to each other.

The photocurable composition of the present disclosure can be effectively used as an adhesive, specifically, a delayed curing type adhesive.

The photocurable composition of the present disclosure can be used as an adhesive for assembling a module or the like which has low heat resistance and is unlikely to be irradiated with active energy rays after assembling due to the complex shape thereof. For example, the photocurable composition of the present disclosure can be used as an adhesive used for attaching a liquid crystal display member or assembling a camera module.

EXAMPLES

Hereinafter, the present disclosure will be described in more detail based on examples. Further, the present disclosure is not limited to the following examples. Further, parts and % in the examples are on a mass basis unless otherwise specified.

FIG. 1 shows conditions such as amounts of components (A) to (E) to be blended in each example and each comparative examples.

Example 1

Example 1 will be described in detail.

Isoamyl acrylate (LIGHT ACRYLATE IAA, manufactured by Kyoeisha Chemical Co., Ltd.) containing one acryloyl group in one molecule without containing an epoxy group in the molecular structure was used as the component (A);

4-hydroxybutyl acrylate glycidyl ether (4HBAGE, manufactured by Mitsubishi Chemical Corporation) containing one epoxy group and one acryloyl group in one molecule was used as the component (B);

pentaerythritol tetrakis(3-mercaptobutyrate) (PE-1, manufactured by Showa Denko K. K.) containing four thiol groups in one molecule was used as the component (C);

alkylphenone-based 1-hydroxycyclohexyl phenyl ketone (Omnirad 184, manufactured by IGM Resins B. V.) was used as the component (D); and 1,2-disopropyl-3-[bis(dimethylamino)methylene] guanidium 2-(3-benzoylphenyl) propionate (WPBG-266, manufactured by Fujifilm Wako Pure Chemical Corporation) which is a salt containing a borate anion was used as the component (E).

First, 12.0 g of the component (A) and 4.6 g of the component (B) were weighted and 0.1 g of the powdery component (D) and 0.2 g of the powdery component (E) were added thereto such that the total amount of the components (A) to (E) to be blended was set to 20 g. The mixture was sufficiently mixed and dissolved using an automatic rotating defoaming stirrer. Thereafter, 3.1 g of the component (C) was added, and the mixture was sufficiently was mixed and dissolved again using an automatic rotating defoaming stirrer to prepare a photocurable composition.

The prepared photocurable composition was irradiated with ultraviolet rays at room temperature (25° C.) and heated to 60° C., and the interaction between the storage elastic modulus and the loss elastic modulus in the oscillation mode measurement in a case of maintaining the temperature of the composition at 60° C. was defined as the timing of gelation. After the composition was irradiated with ultraviolet rays, the time taken to occurrence of the interaction was set to the delay time. Here, the delay time was acquired using a UV irradiation type rheometer (DHR-2, manufactured by TA Instruments Inc.) in the following manner.

Delay Time

The delay time was set as the time taken until the storage elastic modulus intersected with the loss elastic modulus in a case where a transparent stage of a UV irradiation type rheometer was coated with the photocurable composition, the gap was set to 100 μm, the composition was irradiated with UV by setting the UV irradiation amount at 254 nm to 3000 mJ/cm$^2$ using a high-pressure mercury lamp as a light source, and the temperature was increased to 60° C. with a UV irradiation and maintained at 60° C. Here, the temperature was raised at a rate of 5° C./min. Further, the "liquid state" in the state after the irradiation with UV in FIG. 1 indicates the composition has the fluidity, and the "cured" indicates that the composition is not in a state of being "uncured". In FIG. 1, the "uncured" indicates that the composition has the fluidity or the viscosity of the composition is increased to the extent that the fluidity is lost, but the composition is in a state of being viscous. Further, in a case where the composition is not cured after 1 hour, the composition is determined as being uncured.

Storage Stability

The storage stability of the photocurable composition was determined based on a viscosity change rate acquired by transferring the prepared photocurable composition to a light-shielding container and storing the composition at 10° C. for 3 days. The results are shown in FIG. 1.

The viscosity of the photocurable composition was measured using a viscometer (R-215, manufactured by Toki Sangyo Co., Ltd.) at 25° C. First, the viscosity of the composition before the storage was measured, and the value thereof was set to 100%. The photocurable composition was allowed to stand at 10° C. for 3 days, and the viscosity thereof after the storage was measured. Based on the comparison between the viscosity before the storage and the viscosity after the storage, a composition in which the viscosity change rate was 10% or less (that is, the change rate was in a range of 90 to 110 in a case where the viscosity before the storage was set to 100) was evaluated as "A", and a composition in which the change rate was 11% or greater or the fluidity was lost and thus the measurement was not able to be carried out was evaluated as "B".

Overall Determination

The overall determination was "A" in a case where the delay time was shorter than 60 minutes and the storage stability was evaluated as "A", and the overall determination was "B" in a case where the delay time was 60 minutes or longer and the storage stability was evaluated as "B".

As shown in FIG. 1, in regard to the curability, the liquid state of the composition was maintained immediately after the irradiation with ultraviolet rays in all Examples 1 to 5, and the time as the delay time taken to the curing resulting from the second-stage reaction was shorter than 60 minutes. In Comparative Example 1 in which the content of the component (E) was small, the delay time was longer than 60 minutes (that is, the composition of Comparative Example 1 was not cured even after 60 minutes had elapsed). This is because the time for the reaction between the epoxy group of the component (B) and the thiol group of the component (C) increased because the amount of the base generated due to decomposition of the component (E) was small in Comparative Example 1. In Comparative Example 2 in which the content of the component (B) was large, the composition was in a state in which the curability was lost after the irradiation with ultraviolet rays, and thus the delay curability was not exhibited. This is because the content of the epoxy group in the photocurable composition was increased due to the large content of the component (B) and thus the cross-linking reaction extremely proceeded. This result is shown in the result of the storage stability and the result of the viscosity change rate which was larger than 10%. In Comparative Example 3 in which the content of the component (A) was large, the delay curing time was longer than 60 minutes (that is, the composition of Comparative Example 3 was not cured even after 60 minutes had elapsed). This is because the content of the component (B) and the component (C) in the photocurable composition was decreased due to the high content of the component (A) and thus the second-stage reaction did not sufficiently proceed in Comparative Example 3.

In the photocurable composition according to the present disclosure, the time taken from the irradiation of the photocurable composition with active energy rays to the start of curing can be controlled to be in an appropriate range.

Since the photocurable composition of the present disclosure has delay curability, the photocurable composition can be used as an adhesive for attaching a cover material and a liquid crystal panel at the time of producing a liquid crystal display device or the like and is capable of improving the visibility thereof. Further, since the photocurable composition of the present disclosure has delay curability and is cured at the time of being heated at about 60° C. by irradiation with active energy rays such as ultraviolet rays, the photocurable composition can be used as an adhesive for assembling a module which has low heat resistance and is unlikely to be irradiated with active energy rays after the assembling due to the complex shape thereof.

What is claimed is:

1. A photocurable composition consisting of:
   a component (A) which is an acrylic ester compound containing one or more acryloyl groups in one molecule;
   a component (B) which is an acrylic ester compound containing one or more acryloyl groups and one or more epoxy groups in one molecule;
   a component (C) which is a compound containing two or more thiol groups in one molecule;
   a component (D) which is a photoradical generator; and
   a component (E) which is a photobase generator,
   wherein a ratio between (i) a total mass of the component (A) and the component (B) and (ii) a mass of the component (C) is in a range of 67.8:32.2 to 88.0:12.0, inclusive.

2. The photocurable composition of claim 1,
   wherein the component (A) is an acrylic ester compound which contains one or more acryloyl groups in one molecule and does not contain an epoxy group in a molecular structure.

3. The photocurable composition of claim 1,
   wherein a ratio between a mass of the component (A) and a mass of the component (B) is in a range of 20:80 to 80:20, inclusive.

4. The photocurable composition of claim 1,
   wherein a ratio between a mol number of the one or more epoxy groups in the compound of the component (B) and a mol number of the two or more thiol groups in the compound of the component (C) is in a range of 38:62 to 79:21, inclusive.

5. The photocurable composition of claim 1,
   wherein the compound of the component (A) contains one acryloyl group in one molecule.

6. The photocurable composition of claim 1,
   wherein the compound of the component (B) contains one acryloyl group and one epoxy group in one molecule.

7. The photocurable composition of claim 1,
   wherein the compound of the component (C) contains three to six thiol groups in one molecule.

8. The photocurable composition of claim 1,
   wherein the component (D) contains at least one selected from the group consisting of an acetophenone-based compound, a benzoin-based compound, a benzophenone-based compound, a thioxane-based compound, an alkylphenone-based compound, and an acylphosphine oxide-based compound.

9. The photocurable composition of claim 1,
   wherein the component (E) contains at least one selected from the group consisting of a carboxylate having any of a xanthone skeleton and a ketoprofen skeleton, a salt having a borate anion, a quaternary ammonium salt, and a carbamate compound.

\* \* \* \* \*